(12) United States Patent
Yorozuya

(10) Patent No.: US 11,564,062 B2
(45) Date of Patent: Jan. 24, 2023

(54) PORTABLE TERMINAL DEVICE, AND SEARCH SYSTEM

(71) Applicant: Kikuhiro Yorozuya, Fukuoka (JP)

(72) Inventor: Kikuhiro Yorozuya, Fukuoka (JP)

(73) Assignee: Kikuhiro Yorozuya, Fukuoka (JP)

( * ) Notice: Subject to any disclaimer, the term of this patent is extended or adjusted under 35 U.S.C. 154(b) by 86 days.

(21) Appl. No.: 17/087,956

(22) Filed: Nov. 3, 2020

(65) Prior Publication Data

US 2021/0051446 A1 Feb. 18, 2021

Related U.S. Application Data

(63) Continuation of application No. PCT/JP2019/018569, filed on May 9, 2019.

(30) Foreign Application Priority Data

May 9, 2018 (JP) .............................. JP2018-100027

(51) Int. Cl.
*H04W 4/029* (2018.01)
*G08G 1/137* (2006.01)

(52) U.S. Cl.
CPC ............ *H04W 4/029* (2018.02); *G08G 1/137* (2013.01)

(58) Field of Classification Search
None
See application file for complete search history.

(56) References Cited

U.S. PATENT DOCUMENTS 7,076,505 B2 * 7/2006 Campbell ........... G06F 16/9537
715/764

FOREIGN PATENT DOCUMENTS

| JP | H06-188819 A | | 7/1994 |
|---|---|---|---|
| JP | H09-243727 | | 9/1997 |
| JP | 2000-304564 | | 11/2000 |
| JP | 2003-232643 A | | 8/2003 |
| JP | 2005-17052 A | | 1/2005 |
| JP | 2005221419 A | * | 8/2005 |
| JP | 2008225855 A | | 9/2008 |
| JP | 2012-230523 A | | 11/2012 |
| JP | 2012230523 A | * | 11/2012 |
| JP | 2013-508692 | | 3/2013 |
| JP | 2014-48047 A | | 3/2014 |
| JP | 2017-26342 A | | 2/2017 |

OTHER PUBLICATIONS

International Patent Application No. PCT/JP2019/018569; International Search Report; dated Aug. 13, 2019; (2 pages).
EP Search Report for Patent Application No. EP19800015 dated Jan. 28, 2022; 3 pages.

* cited by examiner

*Primary Examiner* — Adolf Dsouza

(74) *Attorney, Agent, or Firm* — Dority & Manning, P.A.

(57) ABSTRACT

The present application includes a search route processor that calculates a plurality of search routes between locations of a plurality of searchers belonging to a predetermined area and a search target based on position information of the search target acquired from a position information terminal held by the search target, and a plurality of portable terminals that is held by the plurality of searchers and displays the plurality of search routes calculated by the search route processor and personal information that identifies the search target.

6 Claims, 6 Drawing Sheets

PORTABLE TERMINAL DEVICE, AND SEARCH SYSTEM

CROSS-REFERENCE TO RELATED APPLICATIONS

The present application is a continuation of International Application No. PCT/JP2019/018569, filed on May 9, 2019, and based upon and claims the benefit of priority from Japanese Patent Application No. 2018-100027, filed on May 9, 2018, the entire contents of which are incorporated herein by reference.

TECHNICAL FIELD

The present application relates to a portable terminal device and a search system for effectively and reliably securing a person to be searched (search target).

BACKGROUND

Detecting a wanderer accompanying with dementia, a lost child, and a kidnapped child is difficult unless such a wanderer or child is found as soon as possible after an event such as wandering is detected, and his or her life may be threatened. For this reason, many related parties such as the police, local groups, and guardians spend a lot of time for searching. As the population ages, the number of wanderers may increase, and there is a need for technology that can efficiently search for the wanderers and reliably protect them.

Conventionally, various methods have been proposed for efficiently searching for a person to be searched such as a wanderer and a lost child, and an animal to be searched such as a lost dog (hereinafter referred to as a search target). For example, there is a method of attaching a sensor or an oscillator to a search target to detect his or her behavior. In this method, a warning signal is generated when the search target leaves his or her home or location or when he or she moves beyond a certain distance, and his or her leaving or moving can be detected and searching can be performed.

In addition, JP H6-188819 A discloses a method of having a target possess a global positioning system (GPS) and activating the GPS from a public line when the target is missing so as to grasp the position of the target. However, in this method, since both the search target and the searcher are moving, it takes time to protect the search target, and the search target may not be protected.

For this reason, JP 1997-243727 A discloses a method in which both of the search target and the searcher possess GPSs and the positional relationship between them is always corrected so as to improve the search accuracy.

Further, in JP 2000-304564 A, provided is a wanderer search system including a search command engine that accepts a search request from a search requester and issues a search command based on contents of the received search request, a position search engine that searches for a position of a wanderer that is a search target based on the search command issued from the search command engine and acquires target position information indicating an area where the wanderer exists, a search execution engine that searches for the wanderer based on information indicating a relative positional relationship between a target position based on the target position information indicating the area where the wanderer exists acquired by the position search engine and a searcher's own tracking position based on position information of the searcher measured by a GPS.

SUMMARY

However, in such a search navigation system, in many cases, calculation processing by a tile map method (section processing method) is performed for a map display, and position information such as latitude and longitude by a GPS is displayed using geographic information system (GIS) map information for each divided section within a predetermined range. Therefore, every time a wanderer or a fugitive moves out of a section, information of the section needs to be downloaded, and a search route or the like needs to be newly calculated and displayed.

As described above, in a method in which a search target such as a wanderer, a lost child, a lost dog is caused to hold a position information search device such as a GPS or a mobile phone with a GPS so that a position of the search target can be grasped when he or she is wandering or lost, and a searcher searches toward a position transmitted from the GPS of the search target, if the search target moves and goes out of the original search section, map information needs to be acquired for each section and a search route needs to be re-calculated. Therefore, a position search calculation needs to be performed again, and it takes time and effort to find the search target. In addition, in a search method in which both of the search target and the searcher are caused to have position information search devices and searching is performed while grasping a positional relationship between the search target and the searcher, if the search target often moves or the searcher is unfamiliar with the area, the searcher needs to go after the search target and thus it takes time to secure the search target.

Moreover, when the search target and the searcher both are moving, when there is a plurality of search targets, and when the search target is sick or a criminal and needs to be urgently secured, it is desired to shorten the search time and perform searching speedily and efficiently.

An object of the present application is to realize a portable terminal device and a search system for speedily and efficiently finding and securing a search target.

In order to solve such a problem and achieve the above object, a search system of the present application includes: a position information terminal that is held by a search target and transmits position information of the search target; a search route processor that calculates a plurality of search routes between locations of a plurality of searchers belonging to a predetermined area and the search target based on the position information of the search target acquired from the position information terminal; and a plurality of portable terminals that is held by the plurality of searchers, transmits position information of the searchers, and displays the plurality of search routes calculated by the search route processor and personal information for identifying the search target, in which the search route processor compares the plurality of search routes with each other to identify a shortest first search route, issues a search command to a first searcher on the first search route to cause the first searcher to start searching along the first search route displayed on corresponding one of the portable terminals, updates the position information of the search target and the search routes as the search target moves, when a second search route is shorter than the first search route, issues a search command to a second searcher on the second search route to cause the second searcher to start the searching along the second search route displayed on corresponding one of the portable terminals, and the plurality of portable terminals displays the search routes by a vector map display in which each intersection is identified as node and a road is identified as a line based on the position information of the search target, and causes the searching to be started to search for the search target whose meeting point to join corresponding one of the searchers is unspecified.

Further, in the search system according to the present application, the search route processor calculates the search routes by assigning a line number and a node number from a position of the search target to the searchers such that the line number and the node number increase every time the node is passed.

Further, in the search system according to the present application, the plurality of portable terminals updates and displays information indicating a positional relationship on the vector map display every time the line number or node number of the searchers and the search target changes on a display screen.

A portable terminal device according to the present application includes: a plurality of portable terminals that, based on position information of a search target acquired from a position information terminal held by the search target, calculates a plurality of search routes by a vector map display in which each intersection is identified as a node and each road is identified as a line between locations of a plurality of searchers belonging to a predetermined area and the search target, displays the calculated plurality of search routes, is held by the plurality of searchers, and transmits the position information of the searchers, in which each of the plurality of portable terminals compares the plurality of search routes to identify a shortest first search route, causes a first searcher on the first search route to start searching along the first search route displayed for the first searcher, updates the position information of the search target and the search routes as the search target moves, when a second search route is shorter than the first search route, and causes a second searcher on the second search route to start the searching along the second search route displayed for the second searcher to search for the search target whose meeting point to join the searchers is unspecified.

Further, in the portable terminal device according to the present application, the portable terminal displays personal information that identifies the search target on a display screen.

With such a configuration, the present application is used to calculate search routes between a search target such as a wanderer, a lost child, or a lost dog and a plurality of search institutions (searchers), a plurality of searchers is used to effectively search for the search target, and searching can be performed between those who are both moving. The means for solving the above problems can be used in combination as much as possible.

When searching for a search target such as a wanderer, a lost child, or a lost dog by the search system configuration according to the present application, a searcher closest to the search target is always engaged in the search even when the searcher and the search target are both moving, and thus it is possible to secure the search target effectively, reliably, and speedily.

Further, using the present application for improving the efficiency of physical distribution delivery enables speedier delivery and efficient physical distribution delivery. That is, when a delivery person who makes a delivery in each area corresponding to each of divisions of an area asks another delivery person (helper) in each area for delivery assistance, the helper needs to search for the delivery person who is moving and deliver packages while continuing his or her delivery operation. As described above, the present application enables an efficient and speedy search between those who are both moving.

The above-described case where the search target and the searcher are both moving can be applied to a case where the police and the like (searcher) searches for a fleeing criminal (search target) in a criminal investigation, a case where regional center staff (searcher) delivers necessary supplies to a moving vehicle (search target), a case where a ride-sharing vehicle system or a taxi driver (searcher) searches for a moving customer (search target), and a case where local drone delivery machine (searcher) delivers relief supplies and fuel to a moving rescue vehicle (search target) in the event of a disaster, as a result of which it is possible to achieve the purpose efficiently, reliably, and speedily.

DETAILED DESCRIPTION

The present application provides a search system that allows a parent or relative, a local supporter, a search related person, the police, or nursing home (hereinafter referred to as searcher) that searches for and investigates a moving person or a moving object such as a wanderer, a lost child, a lost dog, a taxi, a fugitive, or an escaped animal that is moving (hereinafter referred to as a search target) to efficiently perform searching. In addition, by applying the present application to searching or meeting up in a case where the search target and the searcher are both moving, it is possible to construct a search system capable of speedy discovery and reliable capture.

Hereinafter, examples of the present application will be described with reference to the drawings. Each of the drawings described in the following examples is drawn as a schematic view for the purpose of explaining the present application, and the actual dimensions, shapes, and configurations are not particularly limited. Further, the dimensions, materials, shapes, relative arrangements, etc. of the components are not intended to limit the technical scope of the application to those alone unless otherwise specified.

Figure 1:
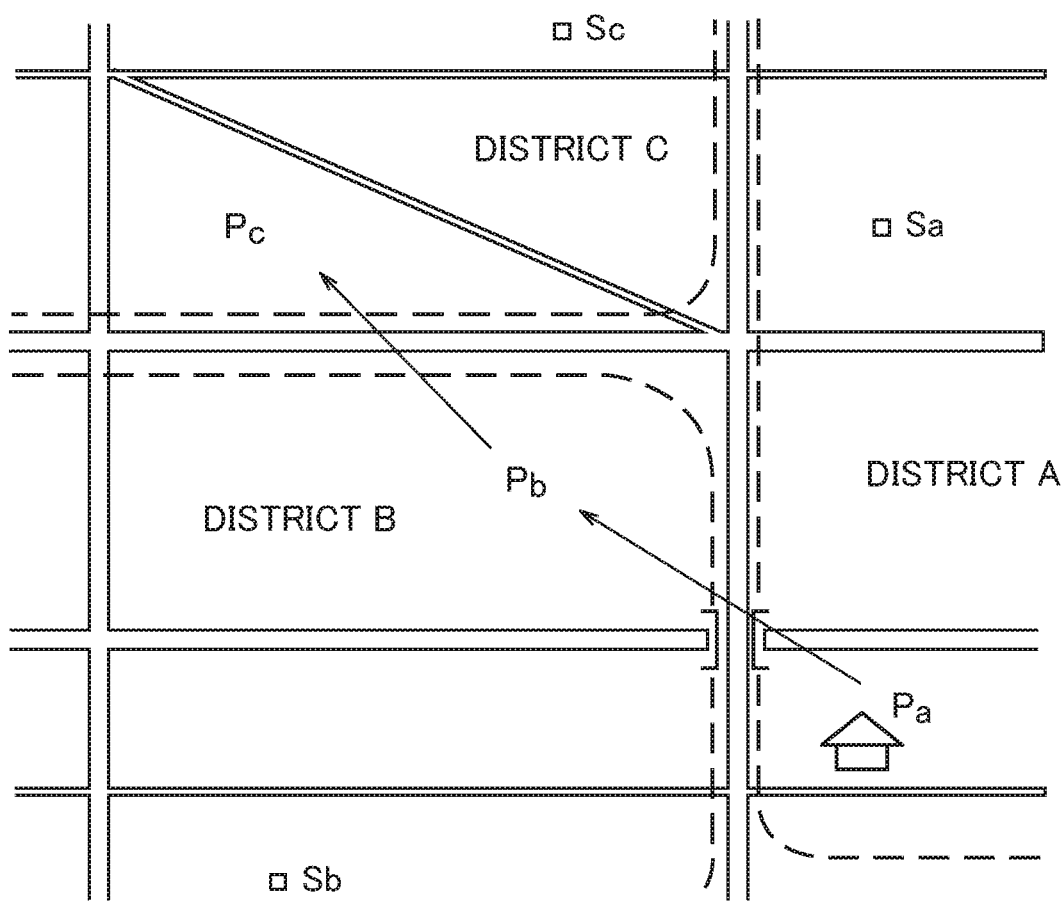
FIG. 1 is an example of a map for explaining a search system according to a first example of the present application.
Figure 2:
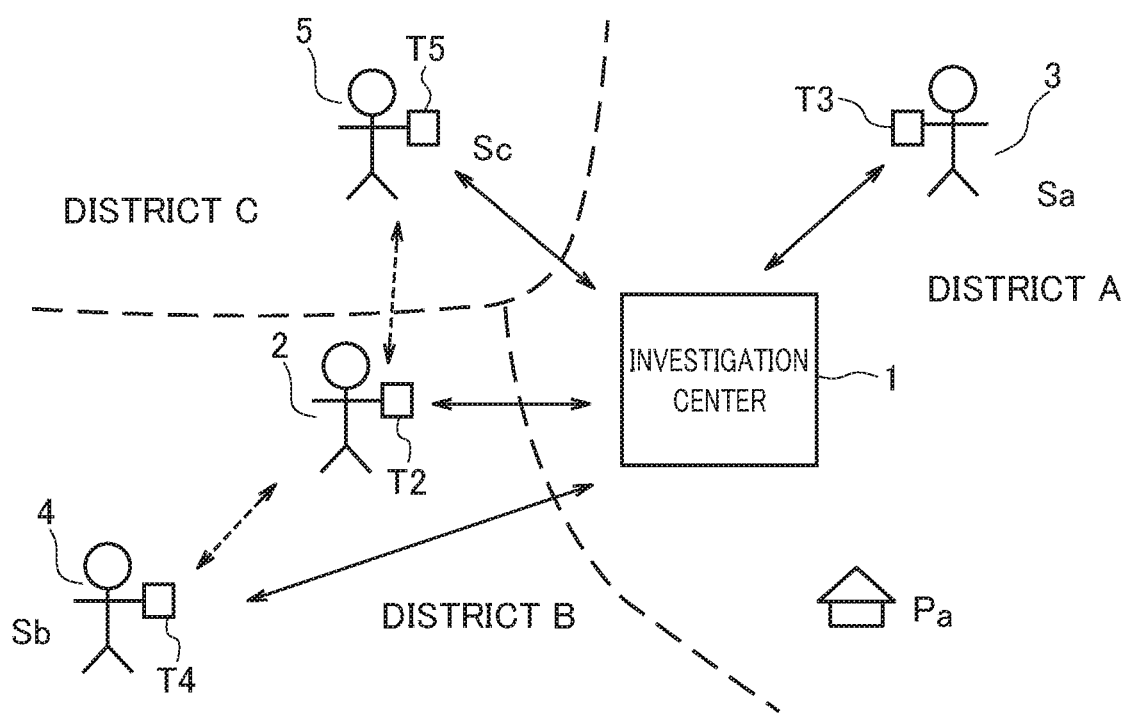
FIG. 2 is a schematic explanatory diagram of the search system according to the first example of the present application.

FIG. 1 is an explanatory map of a wanderer search system according to a first example of the present application. FIG. 2 is a schematic explanatory diagram of the search system according to the first example of the present application. Hereinafter, the first example of the present application will be described with reference to FIGS. 1 and 2.

In FIGS. 1 and 2, Pa indicates home, nursing home, or a base of a moving person or animal such as a wanderer, a lost child, a lost dog, and a fugitive who is a search target 2. A situation is considered where a wanderer has started moving from this base and a place to which the wanderer has moved is unknown and thus searching is required. Pb indicates a current position of the wanderer at the time when a related person recognizes the wandering. In addition, Pc indicates a point to which the wanderer has moved with lapse of time thereafter.

On the map, the governmental jurisdiction is divided by administrative districts, and search bases Sa, Sb, and Sc are provided in districts A, B, and C to investigate and search for a search target, respectively. In a case of searching for a wanderer, these search bases correspond to police stations and police boxes in the administrative districts, and are also bases for local volunteers such as community monitoring services, or safety net bases such as dementia support centers provided by the private sector or local governments. At these regional bases, a searcher 3 is placed in Sa, a searcher 4 is placed in Sb, and a searcher 5 is placed in Sc.

The searchers 3, 4, and 5 are police officers or dementia supporters at the respective search bases, and the searchers include related persons such as the family and relatives of the wanderer. Providing a plurality of search bases described above instead of one in each district enables efficient searching.

It is assumed that the search target 2 is equipped with a global positioning system (GPS) terminal T2 or holds a mobile phone equivalent to a GPS or a personal handy-phone system (PHS) communication terminal 21. These GPS terminals may be incorporated into shoes, clothes, a cane, a belt, or the like that the search target 2 always wears or be worn as a wearable terminal on a part of the body of the search target 2. The GPS terminal T2 constantly transmits GPS position information signals when the search target 2 goes out.

In addition, as illustrated in in FIG. 2, the searcher 3 in the district A has a portable terminal T3, the searcher 4 in the district B has a portable terminal T4, and the searcher 5 in the district C has a portable terminal T5, each of which is configured to be capable of establishing a network with an investigation center 1 once an investigation is started.

It is assumed that the wanderer 2, who is the search target, has started wandering from the base Pa of the wanderer, and when the family, related persons, and the like have noticed the wandering, the wanderer 2 has moved to the point Pb (position at the time of reporting) in the district B. When the family and related persons recognize the wandering, they contact the police or the investigation center 1 and provide information of the wanderer, and a search operation is started.

In the investigation center 1, the current position of the wanderer 2, who is the search target, is grasped by a position information acquisition means of the GPS terminal T2 of the wanderer 2. Next, the investigation center 1 sets a search range around Pb, which is the position at the time of reporting of the wanderer 2, and identifies a search base within the predetermined search range. In the case of the wanderer 2, the predetermined range here is set in consideration of approximate walking speed from the start base Pa to the position Pb at the time of reporting, average walking speed of the wanderer, and topographical characteristics, but it is unnecessary to set an unreasonably wide range to operate many search bases. If no search base exists within the predetermined range, the predetermined range is expanded to search for a search base.

In this example, it is assumed that the district A (the searcher 3 at the point Sa), the district B (the searcher 4 at the point Sb), and the district C (the searcher 5 at the point Sc) are selected within the predetermined search range around Pb. When a plurality search bases exists within the search range, the investigation center 1 calculates search distances and search routes between the wanderer 2, who is the search target, and the search bases (fixed points), and compares the search routes with each other to identify a search base that is supposed to be the shortest search route. If it is specified that the search base Sb and the searcher 4 are on the shortest route when the wanderer 2 is moving on Pb, together with detailed specific personal information (name, gender, age, body shape, characteristics, photos, disappearance time, clothes at the time of disappearance, etc.) of the wanderer 2, notification of a search route signal is provided to the portable terminal T4 of the searcher 4 at the search base Sb from the investigation center 1 by a line node search by a vector map method, and a search command is issued.

Notification of the personal information of the wanderer 2 and search route are provided to all the search bases Sa, Sb, and Sc within the predetermined range so that the wanderer 2 can be searched for. However, in principle, the search command is issued to and the search route is displayed for the searcher who is at the search base on a route that is considered to be the shortest so as to start a search activity. Needless to say, a search command may be issued to a plurality of searchers, and the plurality of searchers may perform searching. Assuming that the search target 2 is currently moving on the point Pb and the base Sb is on the shortest route from Pb, the searcher 4 at the closest base Sb starts searching.

The searchers 3, 4, and 5 at the search bases Sa, Sb, and Sc have portable terminals T3, T4, and T5 with a GPS function, respectively. The portable terminals T3, T4, and T5 continue to transmit position information of the searchers. The portable terminals T3, T4, and T5 constitute a portable terminal device. On the terminals T3, T4, and T5, the search command from the investigation center 1 and movement information of the wanderer 2, and a change of the search route are displayed in real time. The first searcher 4 of the base Sb determined to be on the shortest route at the time of reporting starts searching, and searches for the wanderer 2 according to the search route displayed on the portable terminal T4.

The moving position of the wanderer 2 is always grasped by the GPS terminal T2 held by the wanderer, and the search distance and search route between the moving position of the wanderer 2 and each of the plurality of searchers are always updated by the investigation center 1. The search distance and search route from the investigation center 1 are displayed on the portable terminals T3, T4, and T5 of the respective searchers. The wanderer 2 continues to move from the position Pb at the time of reporting, and when the distance between the position of the wanderer 2 and each searcher is shorter than the distance between the position of the wanderer 2 and the first searcher 4 due to movement, that is, for example, when the wanderer 2 moves from the position Pb at the time of reporting to Pc, the investigation center 1 determines whether a relative distance between the searcher 5 at the search base Sc and the wanderer 2 is shorter than the relative distance between the searcher 4 and the wanderer 2. If the relative distance between the searcher 5 at the search base Sc and the wanderer 2 is shorter than the relative distance between the searcher 4 and the wanderer 2, the investigation center 1 issues a command to the portable terminal T5 of the searcher 5, and the searcher 5 also starts a search investigation.

As described above, a network is formed between the portable terminals T3, T4, and T5 held by the searchers 3, 4, and 5 at the search bases Sa, Sb, and Sc, and the GPS terminal T2 of the search target 2 based on instructions of the investigation center 1. When the search target 2 is moving on Pb, the searcher 4 at the search base Sb on the shortest route from the search target 2 establishes a search network between the GPS terminal T2 of the search target 2 and the portable terminal T4 of the searcher 4, and when the search target 2 moves to Pc, the searcher 5 at the search base Sc on the shortest route from the search target 2 establishes a search network between the GPS terminal T2 of the search target 2 and the portable terminal T5 of the searcher 5. In this case, whether the searcher 4 continues or stops searching is determined depending on the situation.

When the search network is established between the wanderer 2, who is the search target, and the searchers 4 and/or 5, the search route is displayed as a map on the portable terminal of the searcher. This search route displays map search software on the portable terminal of the searcher using vector data as follows. The display of the search route will be described with reference to FIG. 3.

Figure 3:
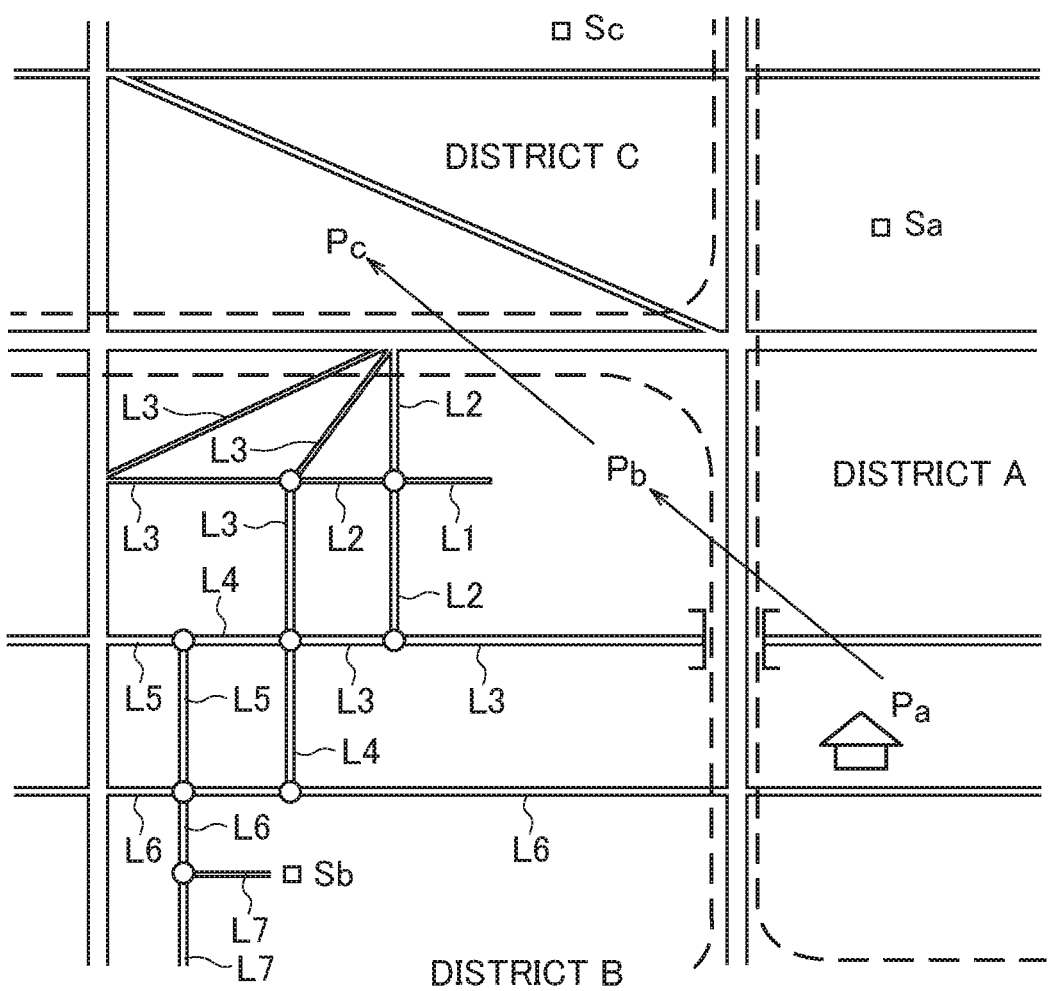
FIG. 3 is an example of a more detailed map of the map illustrated in FIG. 1.

In FIG. 3, it is assumed that the search target 2 is moving on Pb and searching is started from the search base Sb of the searcher 4 in the district B. In the present application, information of publicly available GIS geographic information system is used as a vector map method. This GIS information includes map information such as roads, administrative divisions, houses, blocks, meshes, and points.

As a map display method, a tile map method (raster map) is the main method, but in the tile map method, an area is subdivided and displayed as mesh tiles. Accordingly, each time the display area moves, the mesh tiles of the required area need to be downloaded, and thus it takes time when searching needs to be done in a short time. On the other hand, in the vector map method, objects such as roads and buildings, positions, and shapes on the map are displayed as coordinates such as points, lines (lines, arcs), and polygons. Therefore, as long as data of these coordinates and connection relation are retained, the map can be displayed without interruption.

In the data of the vector map method, roads, buildings, district information, and the like are managed as layers on the map display. In the present application, an appropriate layer is selected from these layers according to search conditions. For example, in a case of searching by car, road markings are displayed around main roads as illustrated in FIG. 1. FIG. 1 is a layer of a road through which a car can pass that also displays attached information such as one-way traffic, vehicle prohibition, and road width. In addition, FIG. 3 is an example of a more detailed map of the map illustrated in FIG. 1, and is a layer displaying a road through which a pedestrian or a bicycle can pass.

Figure 4:
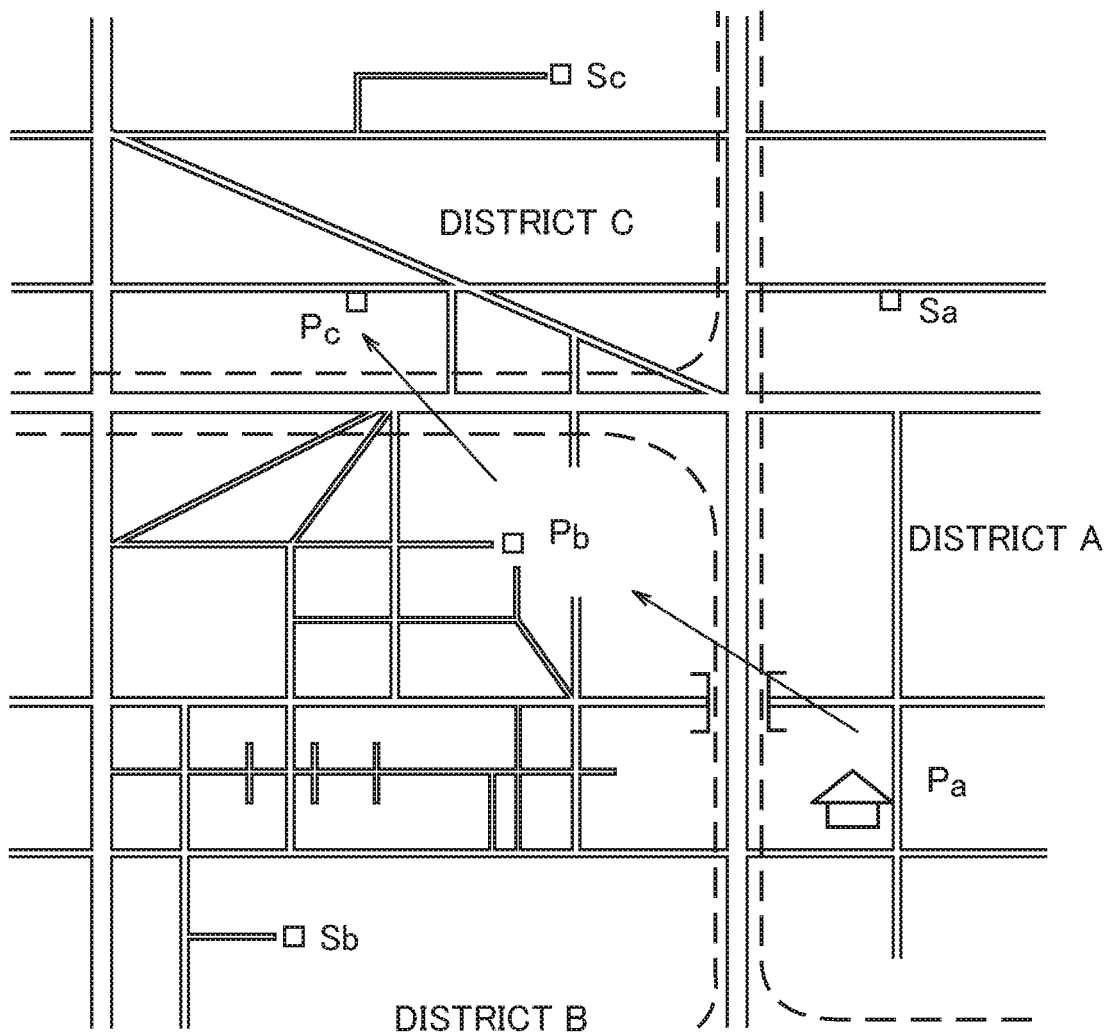
FIG. 4 is an example of a more detailed map of the map illustrated in FIG. 3.

This layer can be divided into many layers, but several layers are sufficient depending on the search purpose and regional characteristics. As the search area is narrowed down, and the searcher approaches the search target, a more detailed display is performed. FIG. 4 is an example of a map illustrating the map illustrated in FIG. 3 in more detail, and illustrates an example of the most detailed map display. The searcher displays each layer such as FIGS. 1, 3, and 4 according to the search purpose and search conditions to perform searching. As the searcher approaches the search target, the searcher displays the layer in more detail and confirms the layer. Within the same layer, the road is followed and displayed continuously as far as possible without being separated.

Figure 5:
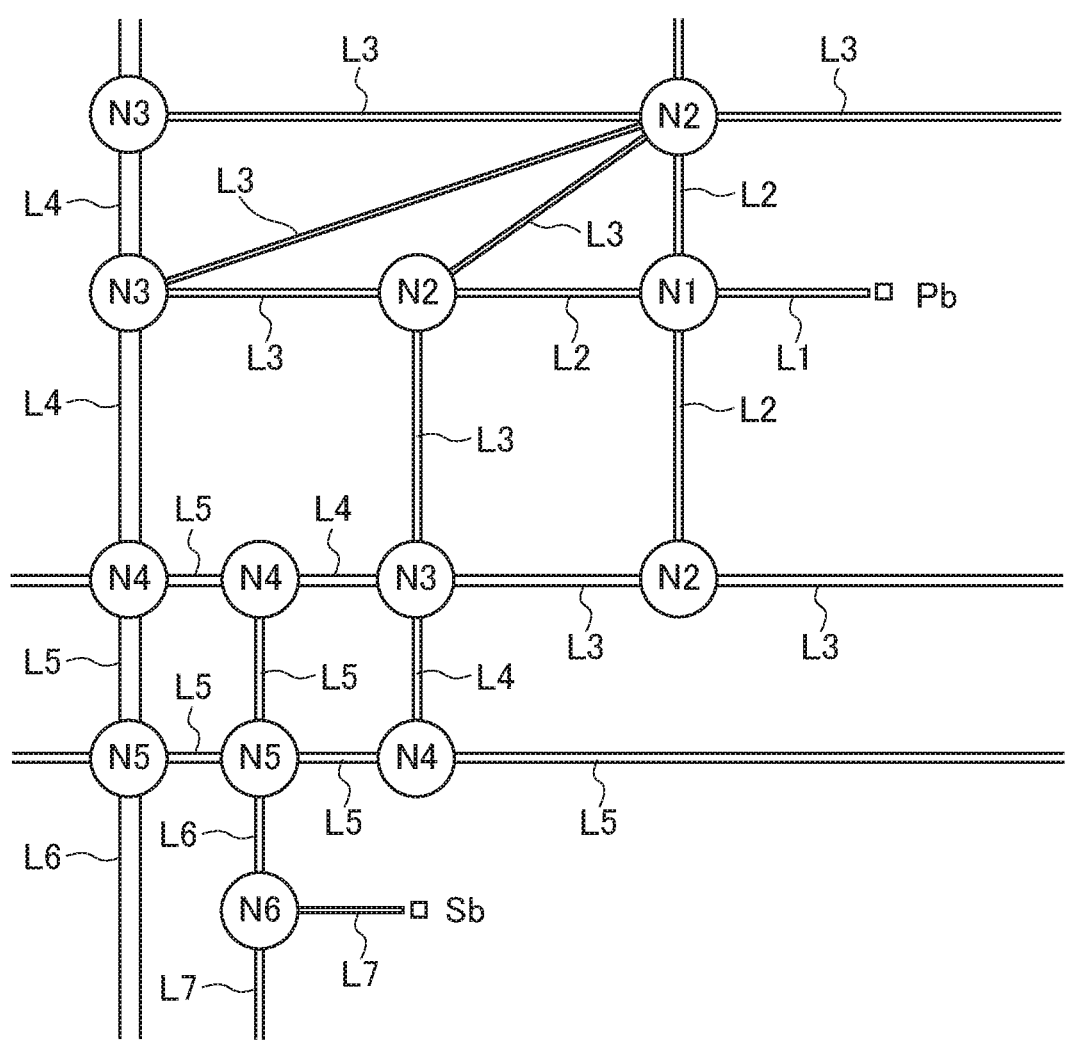
FIG. 5 is an explanatory diagram for calculating a search route of a search system according to the present application.

FIG. 5 is an explanatory diagram for calculating a search route of the search system according to the present application, and the search route is calculated with reference to the layer of the map in FIG. 3. By the GPS held by the search target 2, latitude and longitude information of Pb, which is the current position of the search target 2, is displayed on the portable terminal T4 of the searcher 4. Based on line information (road), point information (intersection), and other attached information such as buildings acquired from the GIS geographic information system, the point information (intersection) is used as a node and each road is used as a line, and a number is assigned to each line closest to the current position Pb of the search target 2.

In FIG. 5, line numbers are given as follows: a road (line) closest to the location Pb of the search target 2 is designated as L1, and a road (line) that intersects the next intersection (node 1) N1 is designated as L2. Similarly, a road (line) that intersects the next intersection (node 2) N2 after L2 is designated as L3. When intersecting a road that has already been given a line number (in this case, intersecting a road with a lower line number), the one with a higher line number of the roads to be intersected is selected and a line number plus one is given. That is, every time a line Ln of a road intersects a node, the line number becomes Ln+1.

In this way, line numbers and node numbers are assigned between the current position Pb of the search target 2 and the current position Sb of the searcher 4. Line numbers and node numbers are displayed on the portable terminal T4 of the searcher 4, and the search route is displayed.

The searcher 4 who receives the search command starts searching from the point Sb. If the searcher 4 starts searching in a direction in which the line numbers and the node numbers decrease, the searcher 4 approaches the search target 2. That is, the searcher 4 selects a direction in which the line numbers and the node numbers decrease at an intersection. If the line numbers are the same at an intersection, the one with the lower node number is selected.

In the portable terminal, a navigation function can be provided by giving an instruction on in which direction the line numbers and the node numbers decrease when an intersection (node) is reached by a change in voice or color or an arrow. Needless to say, it is also possible to display a recommended search line on the map display of the portable terminal. Further, in a portable terminal used in the search system, information indicating the positional relationship on the vector map display is updated and displayed every time the line numbers or node numbers of the searcher and the search target change on the display screen of the terminal device so that searching can be performed while confirming the mutual positional relationship.

According to this line search and node search method, a plurality of the same line numbers and the same node numbers may be generated, and a plurality of routes may be generated. In such a case, no matter which road (line) is selected, the searcher can get closer to the search target, but priority can be given by selecting the shortest distance, shortest time, road width, and the like as conditions.

By giving conditions such as which of a distance or road width is given a priority based on information such as a distance and road width obtained as attached information of each road (line) from the GIS information, it is possible to give a priority and perform specification. In this case, the shortest search route can be normally calculated by a Dijkstra method.

Coding of the line numbers and the node numbers as illustrated in FIG. 5 is considered to extend endlessly between the search target and the searcher, but it is sufficient to display only within the predetermined search range that has been initially set around the current position Pb of the search target 2 as a display range. However, if the moving speed of the search target 2 is faster than the searchers 3, 4, and 5 and exceeds the initial search range, the search range needs to be reset and the search base and the searcher need to be selected.

For the calculation of the search route, the search route is selected by the line numbers and the node numbers by the vector map method. For the acquired GIS geographic information, its calculation processing, and processing of linking with GPS data, a central processing unit (CPU) of the investigation center 1 performs processing control, calculation result information and instructions of the search route are sent to the terminal of each searcher, and a map is displayed on the portable terminal. The CPU of the investigation center 1 corresponds to the search route processor of the present application.

In this way, the investigation center 1 transmits information to each of the searchers 3, 4, and 5, specifies the searcher, and gives a search instruction. However, since the GPS information is constantly transmitted from the search target, the investigation center 1 and the searcher 3, 4, or 5 can receive and confirm the position of the search target in real time, and can confirm the moving position of the search target 2 even if the searcher and the search target are both moving. As the search target 2 moves, the search route is updated in real time, and the searcher can continue to search for the search target.

In addition, it is necessary for the portable terminal to have dedicated application software for search, and in the terminal application software, which line number or node number is decreased at each intersection of the search route is displayed by voice, an arrow, color change, or the like. Acquisition of GIS geographic information and calculation processing are performed by the CPU. In the portable terminal, it is only necessary to acquire the GPS information (latitude, longitude) of the search target and display the information on the map. Therefore, basically the terminal only needs to perform voice and drawing processing, and extract a search range that has been initially set for each layer as a display area, and thus the processing in the terminal can be configured to be quick and simple.

As described above, since a search navigation according to the present application assigns numbers of all the search-related roads within the search range by the line (road) numbers and the nodes (intersection) by the vector map method, compared to a method of acquiring map road information necessary for each divided information and calculating the search route while recalculating the search route within the divided map information, quicker display is made possible, and the searcher can continue to follow the search target who is moving in real time.

Figure 6:
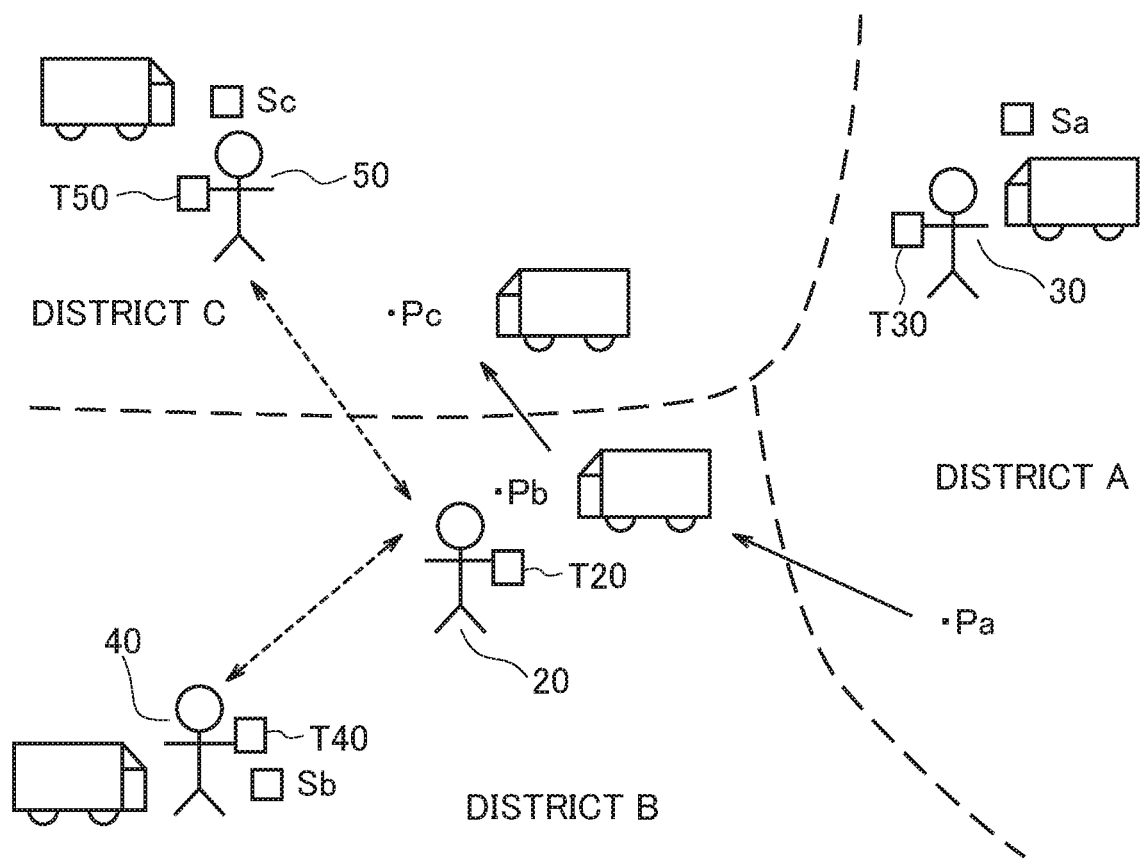
FIG. 6 is an explanatory diagram of a search system for improving efficiency of physical distribution delivery according to a second example of the present application.

FIG. 6 is an explanatory diagram of a search system illustrating an example in which the present application is applied to efficiency improvement of physical distribution delivery. As a delivery method in a physical distribution delivery system, an area of a delivery company is divided into districts A, B, and C, for the respective regional bases, and an efficient delivery route is determined according to the delivery destination of the day within the divided section. When determining the delivery route, many conditions such as delivery address, road information such as one-way traffic and no entry, delivery time limit, delivery vehicle stop position and time limit, working hours and break time limit of the delivery person are taken into consideration to determine an optimal route, but the delivery time always fluctuates due to circumstances such as an increase or decrease in the number of deliveries and redelivery during absence. Therefore, in some districts, delivery may not be completed within a predetermined working time, causing problems such as delay in delivery.

Many delivery companies employ a system in which a delivery vehicle is temporarily stopped at a designated location within the delivery route, from which the delivery person uses a cart or bicycle to make a delivery to nearby delivery destinations. As an example, as illustrated in FIG. 6, a case is assumed where a delivery person 20 who departs from a point Pa in the district A determines that the delivery person may not be able to delivery all the packages he or she has at a temporary stop point Pb on a delivery route within a specified delivery time, and requests delivery assistance from a delivery person in a nearby district. In this case, the delivery person 20 corresponds to the searcher, and the delivery assistant corresponds to the search target.

The delivery person (searcher) 20 in the district A, another delivery person 30 in the same district, a delivery person 40 in the district B, and a delivery person 50 in the district C have portable terminals T20, T30, T40, and T50 having a GPS function, respectively, so that delivery positions can be always confirmed. The delivery person 20 searches for a delivery person at a delivery base or another district existing within a predetermined range around the current position Pb. While expanding or reducing the search range, whether delivery assistance can be provided is checked by mobile phone or e-mail communication in order from the delivery person at the shortest distance. As another method, the delivery person 20 can request delivery assistance from a delivery center 10 or the like while continuing his or her delivery operation, and the delivery center 10 can select a delivery assistant who can provide delivery assistance.

In FIG. 6, the person desiring delivery assistance 20 starts delivery from the point Pa in the district A, needs delivery assistance at the point Pb, and sends a delivery assistance request by the portable terminal T20. It is assumed that the delivery person 30 in the district A, the delivery person 40 in the district B, and the delivery person 50 in the district C are selected as candidates for the delivery assistant that can provide delivery assistance within the predetermined range. These delivery persons also continue their delivery operations, and an optimal delivery assistant is selected by calculating an arrival route, distance, and time to the point Pb, taking into consideration the delivery status of the remaining packages in their delivery operations, possibility of providing assistance, and the like. In this example, it is assumed that the delivery person 40 in the district B is selected as the most optimal delivery assistant.

The delivery assistant 40 in the district B continues his or her delivery operation and is moving, but has reached the point Sb point at the time of receiving the delivery assistance request, and performs a route search between the point Sb and the position Pb of the assistance requester 20 by the portable terminal T40 of the delivery assistant 40. This search method is a method of assigning line numbers and node numbers based on the vector map described above. When the search route between the point Sb and the point Pb is indicated, the delivery assistant 40 follows the indicated route to the location of the assistance requester 20.

Here, in the first example, the CPU in the investigation center 1 calculates and processes the GIS geographic information and the GPS position information, and the investigation center 1 contacts each searcher, but in the second example, the GIS geographic information and calculation information processing are uploaded on the cloud, necessary area information is downloaded to the portable terminal of each searcher as appropriate, and GPS information (latitude, longitude) of the search target is called to the portable terminal of each searcher to display the search route on the portable terminal. As a result, a network is established between the portable terminal T20 of the assistance requester 20 and the portable terminal T40 of the delivery assistant 40, and the GPS position information of the assistance requester 20 is acquired by the portable terminal of the delivery assistant 40 and the search route is calculated and displayed by the portable terminal T40 of the assistant 40.

The search route is constantly updated in real time while the delivery assistant 40 heads for the point of the assistance requester 20. In the meantime, if the assistance requester moves from the point Pb to the point Pc due to his or her delivery operation, and the portable terminal T50 determines that the distance between the delivery assistant 50, who is a backup candidate, and the moving point Sc of the assistance requester 20 is shorter than the distance or time between the assistance requester 20 and the delivery assistant 40, the delivery assistant 50 holding the portable terminal T50 goes for assistance. On the portable terminal T50 of the delivery assistant 50, the search route from the position of the requester 20 at this time is displayed in line numbers and node numbers. Whether the delivery assistant 40 stops the assistance and leaves it to the assistant 50 or jointly provides delivery assistance with the assistant 50 is determined by the assistance requester 20.

In this way, by performing the route search by the method of assigning line numbers and node numbers with the vector map according to the present application, even while the delivery assistants and the delivery assistance requester placed in the respective areas continue their delivery operations and each continue to move, the search route is continuously updated and displayed. Therefore, there is no need to calculate detailed map information and search route for each section and display them again, and thus this method can be effectively used for searching a route between objects that are both moving. In addition, since delivery assistant candidates and delivery bases are placed in the respective areas, and a network is formed with the delivery assistance requester, even when the delivery assistance requester and assistant candidates are all moving, it is possible for the closest delivery assistant to rush to the delivery assistance requester according to the situation, and thus it is possible to efficiently collect and deliver packages.

As described above, an example in which the present application is applied to searching and investigation between searchers assigned by area and a search target such as a wanderer or a lost child, and an example in which the present application is applied to a case where delivery and collection operations are helped among the respective areas such that the delivery and collection operation can be efficiently performed have been explained. However, the present application is not limited to these examples, and by combining a plurality of components of the present application as appropriate, the present application can be widely applied to cases where the searcher and the search target are both moving such as a lost dog or animal search, criminal investigation, delivery of relief supplies between moving vehicles in the event of a disaster, and searching for or contacting a taxi for ride sharing, and has great industrial usefulness and applicability.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A portable terminal device comprising:
a plurality of portable terminals that, based on position information of a search target acquired from a position information terminal held by the search target, are configured to calculate a plurality of search routes by a vector map display in which each intersection is identified as a node and each road is identified as a line between locations of a plurality of search sides belonging to a predetermined area and the search target, display the calculated plurality of search routes, is held by the plurality of search sides, and transmit the position information of the search sides, wherein
each of the plurality of search sides are located in a separate sector of the predetermined area,
both the plurality of search sides and the search target are movable, wherein a meeting point of the search target to join a corresponding one of the search sides is unspecified, and
each of the plurality of portable terminals are configured to compare the plurality of search routes with each other to identify a shortest first search route, cause a first search side on the first search route to start searching along the first search route displayed for the first search side, update the position information of the search target and the search routes as the search target moves, when a second search route is shorter than the first search route, cause a second search side on the second search route to start the searching along the second search route displayed for the second search side.

2. The portable terminal device according to claim 1, wherein the portable terminal is further configured to display personal information that identifies the search target on a display screen.

3. A search system comprising:
a position information terminal that is held by a search target and configured to transmit position information of the search target;
a search route processor configured to calculate a plurality of search routes between locations of a plurality of search sides belonging to a predetermined area and the search target based on the position information of the search target acquired from the position information terminal, each of the plurality of search sides are located in a separate sector of the predetermined area; and
a plurality of portable terminals that is held by the plurality of search sides, and configured to transmit position information of the search sides, and display the plurality of search routes calculated by the search route processor and personal information for identifying the search target, wherein
both the plurality of search sides and the search target are movable, wherein a meeting point of the search target to join a corresponding one of the search sides is unspecified,
the search route processor is configured to compare the plurality of search routes with each other to identify a shortest first search route, issue a search command to a first search side on the first search route to cause the first search side to start searching along the first search route displayed on a first corresponding one of the portable terminals, update the position information of the search target and the search routes as the search target moves, when a second search route is shorter than the first search route, issue a search command to a second search side on the second search route to cause the second search side to start the searching along the second search route displayed on a second corresponding one of the portable terminals, and the plurality of portable terminals are configured to display the search routes by a vector map display in which each intersection is identified as a node and a road is identified as a line based on the position information of the search target, and cause the searching to be started.

4. The search system according to claim 3, wherein the search route processor is configured to calculate the first search route by assigning a first set of line numbers and a first set of node numbers between a current position of the search target and a current position of the first search side such that the first set of line numbers increase every time a subsequent node is passed.

5. The search system according to claim 4, wherein the plurality of portable terminals are further configured to update and display information indicating a positional relationship on the vector map display every time line numbers or node numbers of the search sides and the search target change on a display screen.

6. The search system according to claim 4, wherein the search route processor is further configured to calculate the second search route by assigning a second set of line numbers and a second set of node numbers between the current position of the search target and a current position of the second search side such that the second set of line numbers increase every time a subsequent node is passed.

* * * * *